Sept. 30, 1930. O. SIEPER 1,777,233
SOLDERING APPARATUS
Filed June 8, 1928
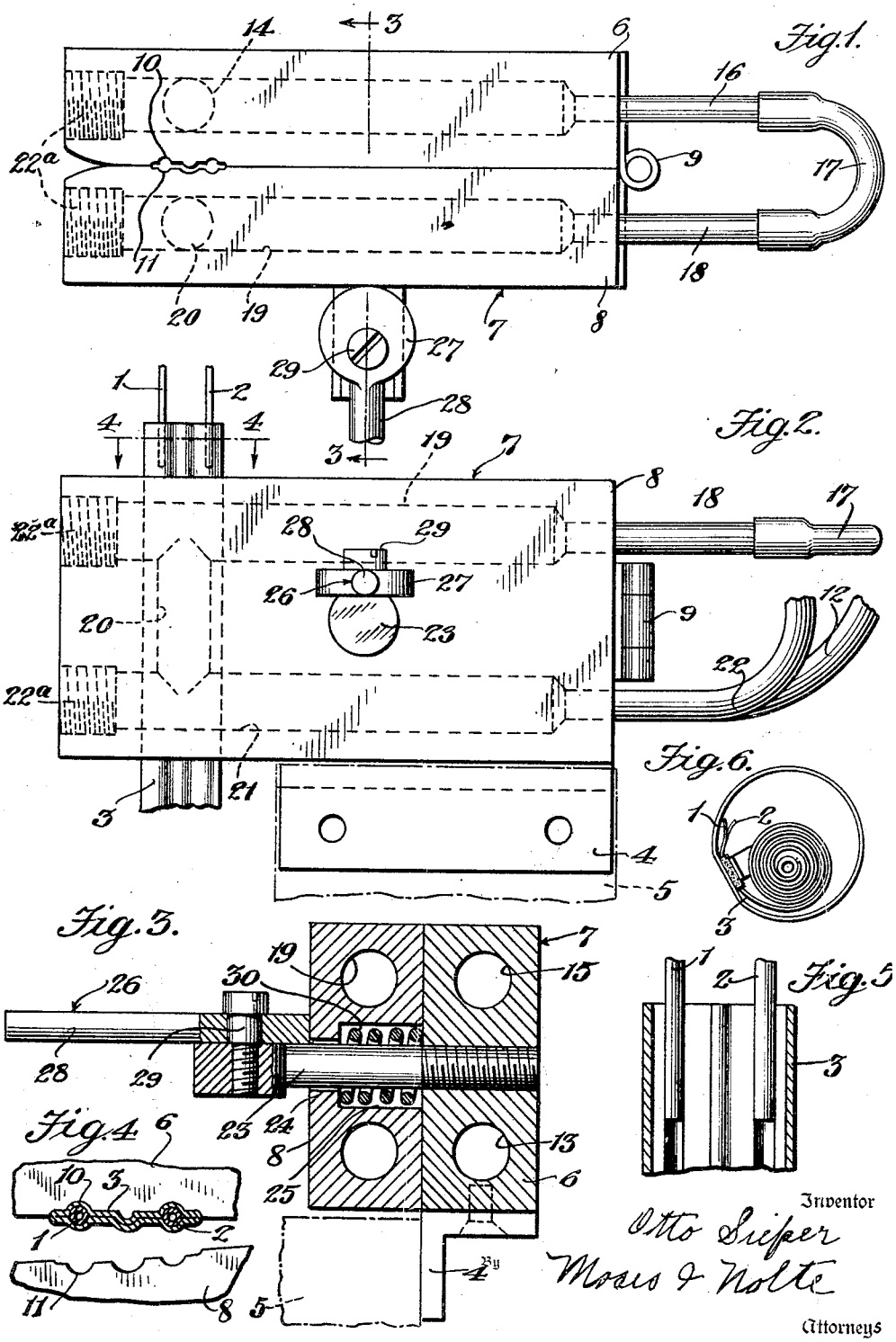
Inventor
Otto Sieper
Moses & Nolte
Attorneys Patented Sept. 30, 1930

1,777,233

UNITED STATES PATENT OFFICE

OTTO SIEPER, OF RICHMOND HILL, NEW YORK, ASSIGNOR TO MOTO METER GAUGE & EQUIPMENT CORPORATION, OF LONG ISLAND CITY, NEW YORK, A CORPORATION OF DELAWARE

SOLDERING APPARATUS

Application filed June 8, 1928. Serial No. 283,773.

This invention has to do with soldering or brazing, and particularly with controlling the temperature of the body or bodies being worked on where the usual soldering or brazing temperature would be apt to result in injury to desired properties of the bodies.

As illustrated in the present application, by way of example, the invention may have utility in connection with the soldering or brazing of the filling tube and the pressure transmitting capillary tube to the Bourdon coil of a distance type thermometer or other pressure operated instrument. The Bourdon coil of such an instrument, after being joined to the capillary, pressure-transmitting tube, and to the filling tube, is soldered by means of a soft solder to the frame by which the instrument movement is carried. It has been the practice heretofore to use soft solder for each of these successive soldering operations. Under such circumstances, it has frequently happened that the first solder applied in uniting the Bourdon coil with the filling and pressure tubes has been fused and caused to flow at the second soldering operation with the result that the joint between the Bourdon coil and said tubes has been unsealed, or that the end of said tubes or one of them has been closed by the solder, making it impossible to complete the manufacture of an operative instrument.

In accordance with the present invention, this difficulty is overcome by using a hard solder having a relatively high melting point for the first soldering operation and the usual soft solder for the second. For example, a high melting solder, such as a silver solder, is desirably employed for uniting the Bourdon coil with the pressure transmiting and filling tubes, and a relatively low melting solder is employed for subsequently uniting the Bourdon coil with the instrument frame. By the adoption of this practice a workman of ordinary skill is enabled to perform the second soldering operation without any substantial danger of injuriously affecting the work accomplished at the first soldering operation.

The use of hard solder for uniting the Bourdon coil with the pressure transmitting and filling tubes is also highly desirable for the reason that it effects a much stronger and more durable joint and a more permanent seal than the soft solders heretofore employed for the purpose.

The use of such a solder has not been practicable heretofore, however, for the reason that the high soldering temperature required would cause the Bourdon coil to be heated to such an extent that the temper of a considerable portion of the coil, of indefinite length, would be changed and rendered stiff and therefore not responsive to the desired extent to variations of pressure within it.

It is an important object of the present invention to enable the superior type of joint obtainable by the use of hard solder to be effected between the Bourdon coil and the pressure transmitting and filling tubes, without injuriously affecting the Bourdon coil.

To this end provision is desirably made of a heat dissipating holder in which the end of the Bourdon coil is held during soldering, and by which the flexible part of the Bourdon coil is positively guarded against injurious over-heating.

In the illustrative embodiment of the invention, such holder consists of cooperating metallic jaws having passages for the circulation of cooling water therethrough, but it will be understood that the invention is not confined in its broader aspects to the employment of any particular cooling medium or to the provision of any circulatory system at all, it being necessary only that the clamp shall have a capacity for absorbing or dissipating heat sufficient to prevent the transmission of heat to an injurious degree to the flexible part of the work piece.

Other objects and advantages will hereinafter appear.

In the drawings forming a part of this specification:

Figure 1 is a plan view of a clamp embodying features of the present invention;

Figure 2 is a side elevation of said clamp;

Figure 3 is a vertical, sectional view through the clamp on the line 3—3 of Figure 1, looking in the direction of the arrows;

Figure 4 is a horizontal view on the line 4—4 of Figure 2 looking in the direction of the arrows;

Figure 5 is a fragmentary, vertical section on an enlarged scale through an end of the Bourdon tube showing how the connected tubes are fitted therein; and Figure 6 is a diagrammatic, plan view showing how the Bourdon coil is soldered to the instrument frame substantially at its junction with the tubes 1 and 2.

In the illustrative embodiment of the invention novel mechanism is used for brazing the capillary tube 1 and the filling tube 2 to a Bourdon tube 3. This brazing operation is preferably performed with the Bourdon tube in a straight condition and the Bourdon tube is subsequently wound into a spiral coil and soldered by means of soft solder to the instrument frame.

The finished instrument may be, for example, of the type disclosed in the pending application of Herman Schlaich, Serial No. 65,092, for indicating instruments, filed October 27, 1925.

As has been pointed out above, it has been impracticable heretofore to braze the tubes 1 and 2 to the Bourdon tube 3 because, by methods heretofore known the high temperature required for brazing would cause such excessive heating of the Bourdon tube that the desired temper of a portion of the tube would be destroyed, so that uniformity in the finished instruments could not be maintained.

In accordance with the present invention the brazing heat is controlled and dissipated without permitting the Bourdon tube to be injuriously affected. A bracket 4 fixed on a work table 5 rigidly supports a jaw 6 of a clamp 7 in which the Bourdon tube is held during brazing. The clamp 7 comprises a second jaw 8 connected to the jaw 6 by a hinge 9. The jaws 6 and 8 have surfaces adapted to fit the work piece in extensive and intimate engagement therewith except in the immediate vicinity of the soldering or brazing point, these surfaces as here illustrated constituting complementary recesses 10 and 11 which, when the jaws are brought together, form a passage between them of a shape and size to closely fit the Bourdon tube. The jaws 6 and 8 are formed of heat absorbing and conducting material and as here shown are provided with bores or passages through which cooling water is caused to circulate for controlling the temperature of the clamp and carrying off the heat transmitted to the clamp from the Bourdon tube.

A water supply pipe 12 is connected to a lower passage 13 in the jaw 6 and communicates at its forward end with an upwardly extending, vertical passage 14 which runs alongside the recess 10. The passage 14 communicates at its upper end with an upper horizontal passage 15, which, in turn, is connected through a pipe 16, a flexible tube 17, and a second pipe 18 with an upper horizontal passage 19 in the movable jaw. The passage 19 communicates with a downwardly extending passage 20 alongside the recess 11 and the passage 20 in turn lets into a rearwardly extending, horizontal passage 21 in the lower part of the movable jaw 8. The passage 21 communicates at its rear end with a water discharge pipe 22. From the foregoing description it will be seen that the water entering the clamp from pipe 12 first flows through the passages of the fixed jaw 6, then through the passages of the movable jaw 8, and then through the discharge pipe 22. The pipe 12 may be connected to an ordinary water faucet and the rate of flow may be regulated to maintain the clamp and the Bourdon tube held thereby at the temperature desired.

The described passages through the jaws 6 and 8 may be bored therein and the ends of the passages may be closed by suitable plugs, as 22$^a$, indicated in dotted lines in Figures 1 and 2.

An I-bolt 23 extends through a small bore 24 and a large bore 25 of the movable clamp jaw 8, and is threaded into the fixed clamp jaw 6. An operating member 26 comprising a cam or eccentric 27 and a handle 28, and pivoted on the I-bolt 23 by means of a bearing screw 29, may be swung in one direction to press the movable jaw 8 into firm clamping engagement with the fixed jaw 6, and may be moved in the opposite direction to release such clamping pressure. A coil compression spring 30 in the large bore 25 of the movable jaw 8 acts to force the jaws apart as soon as the clamping pressure of the operating member 26 is released.

In the use of the device the Bourdon tube 3 is placed in the recesses 10 and 11 of the jaws 6 and 8 with its upper end extending a short distance above said jaws. The operating member 26 is then swung to clamp the Bourdon tube in the jaws. The tubes 1 and 2 are then set in the end of the Bourdon tube and brazed thereto. The jaws are then opened and the operation described is repeated upon other pieces of work.

It is a feature of the described clamp that it is capable of dissipating the brazing heat fast enough to enable the clamp to be used continuously without any interruption for cooling of the clamp between operations. Such capacity is not necessary to the practicing of the invention, however, since the primary object of the invention would be attained by any means capable of enabling a single brazing operation to be performed without injuriously affecting the work.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

A device for holding a work piece and controlling the temperature thereof during soldering or brazing, comprising heat absorbing and conducting jaws formed to fit the work piece and having sufficient heat dissipating capacity to confine the temperature of the work piece within a desired range, a spring urging said jaws apart, and means operable to move said jaws positively into work clamping relation and to retain them so.

In testimony whereof I have affixed my signature to this specification.

OTTO SIEPER.